Figure 1:
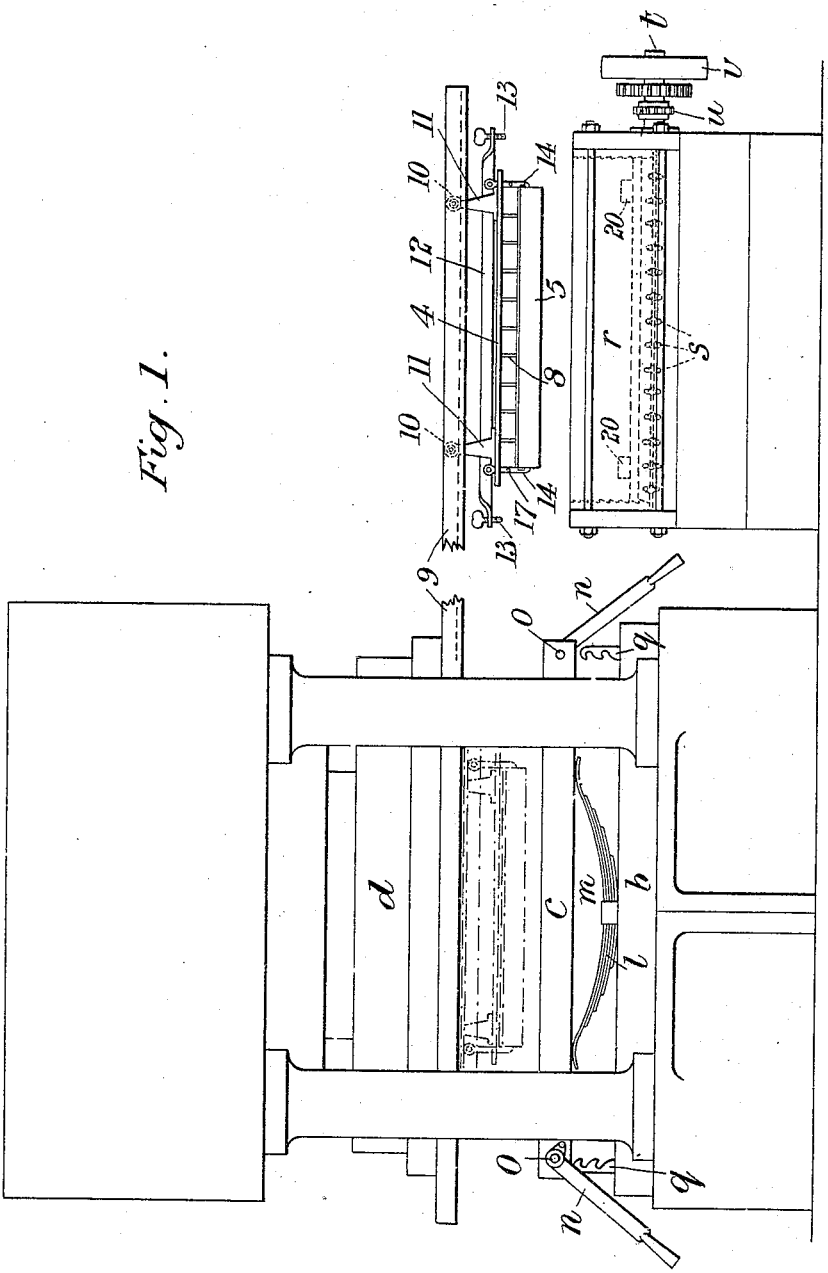

No. 773,889. PATENTED NOV. 1, 1904.
T. J. PALMER.
MANUFACTURE OF MOLDED OR EMBOSSED PANELS.
APPLICATION FILED APR. 29, 1904.
NO MODEL. 6 SHEETS—SHEET 1.

WITNESSES
F. W. Wright.
Walter Abbe

INVENTOR
Thomas John Palmer
BY
Howson and Howson
ATTORNEYS

No. 773,889. PATENTED NOV. 1, 1904.
T. J. PALMER.
MANUFACTURE OF MOLDED OR EMBOSSED PANELS.
APPLICATION FILED APR. 29, 1904.
NO MODEL. 6 SHEETS—SHEET 2.

WITNESSES

INVENTOR
Thomas John Palmer
BY
Howson and Howson
ATTORNEYS

No. 773,889. PATENTED NOV. 1, 1904.
T. J. PALMER.
MANUFACTURE OF MOLDED OR EMBOSSED PANELS.
APPLICATION FILED APR. 29, 1904.
NO MODEL. 6 SHEETS—SHEET 3.

WITNESSES
F. W. Wright
Walter Abbe

INVENTOR
Thomas John Palmer
BY
Howson and Howson
ATTORNEYS

No. 773,889. PATENTED NOV. 1, 1904.
T. J. PALMER.
MANUFACTURE OF MOLDED OR EMBOSSED PANELS.
APPLICATION FILED APR. 29, 1904.
NO MODEL. 6 SHEETS—SHEET 4.

WITNESSES

INVENTOR
Thomas John Palmer
BY
Howson and Howson
ATTORNEYS

No. 773,889. PATENTED NOV. 1, 1904.
T. J. PALMER.
MANUFACTURE OF MOLDED OR EMBOSSED PANELS.
APPLICATION FILED APR. 29, 1904.
NO MODEL. 6 SHEETS—SHEET 5.

WITNESSES
G.W. Wright
Walter Abbs

INVENTOR
Thomas John Palmer
BY
Howson and Howson
ATTORNEYS

No. 773,889. PATENTED NOV. 1, 1904.
T. J. PALMER.
MANUFACTURE OF MOLDED OR EMBOSSED PANELS.
APPLICATION FILED APR. 29, 1904.
NO MODEL. 6 SHEETS—SHEET 6.

WITNESSES

INVENTOR
Thomas John Palmer
BY
Howson and Howson
ATTORNEYS

No. 773,889. Patented November 1, 1904.

UNITED STATES PATENT OFFICE.

THOMAS JOHN PALMER, OF SOUTHPORT, ENGLAND.

MANUFACTURE OF MOLDED OR EMBOSSED PANELS.

SPECIFICATION forming part of Letters Patent No. 773,889, dated November 1, 1904.

Application filed April 29, 1904. Serial No. 205,538. (No model.)

*To all whom it may concern:*

Be it known that I, THOMAS JOHN PALMER, anaglypta manufacturer, a subject of the King of Great Britain and Ireland, residing at 36 Arbour street, Southport, in the county of Lancaster, England, have invented certain new and useful Improvements Relating to the Manufacture of Molded or Embossed Panels and the Like, of which the following is a specification.

This invention relates to the manufacture of molded or embossed panels and the like from a pulp made from paper-making materials or materials which are made into a pulp with water or other liquid with or without the admixture of matter that will waterproof or fireproof or both waterproof and fireproof the panels, sufficient liquid being used to make it of such a fluid consistency that it will readily pass into the minutest details of the recesses in a pattern-plate which forms the required design. The fluid pulp is then subjected to pressure, so as to consolidate it in such way and by such means that the liquid is removed from the pulp, while the fibrous or solid matter of the pulp remains and forms the required panel.

The object of this invention is to enable the fluid-pulp to be evenly and quickly distributed upon every portion of the plate, so that the panel or the like produced shall be of practically uniform density.

A further object is to enable predetermined quantities of pulp to be so delivered in order that all panels or the like may be made with certainty of equal density.

In some cases the fluid pulp may be so delivered onto a plain plate or bed forming a receptacle for the pulp and the pattern-plate be pressed into it while thereon. For this purpose I have devised what I will hereinafter refer to as a "pulp-frame," consisting of a receptacle with openings at bottom and means for closing them so arranged that when the said pulp-frame is lowered into the pulp in a pulp-vat the openings are unclosed for admission of pulp to the frame, and when the said frame is lifted the openings are closed to retain the pulp.

Figure 3:
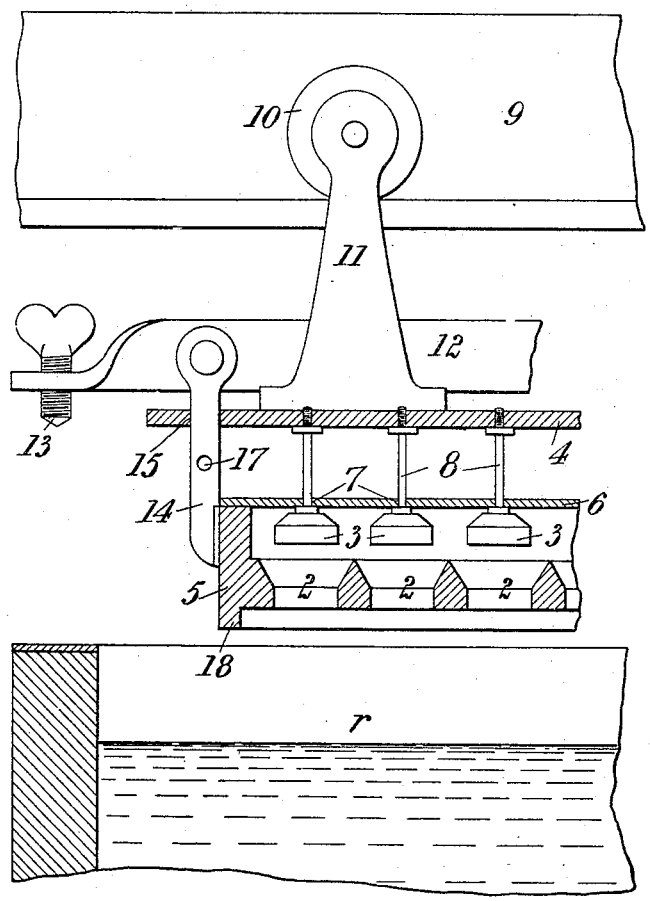
Figure 4:
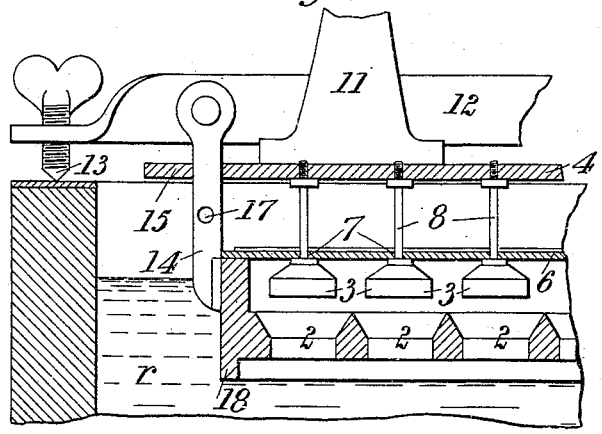
Figure 5:
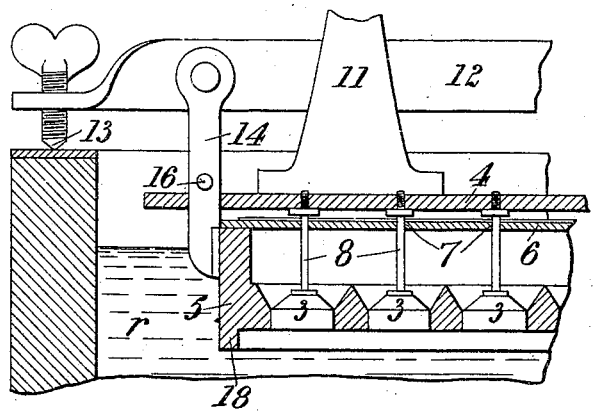
Figure 10:
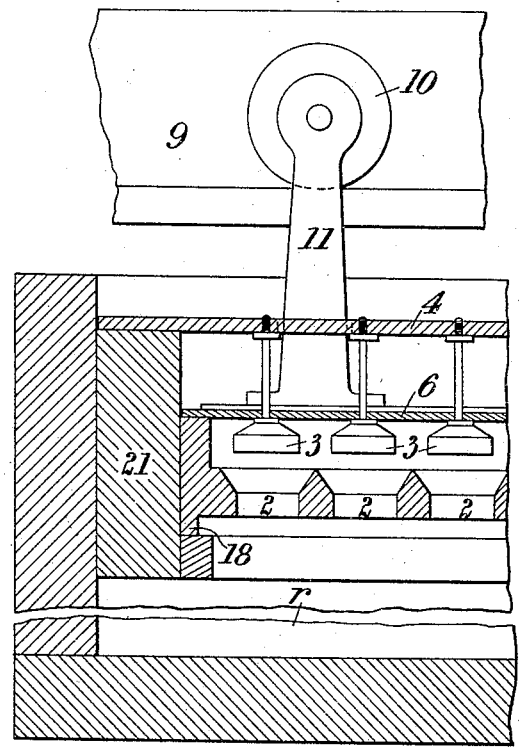
Figure 11:
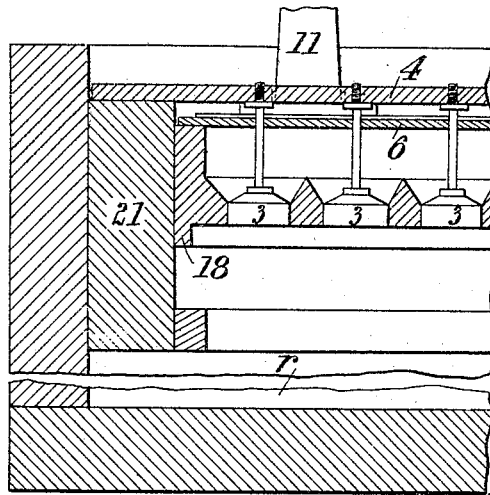

In the accompanying illustrative drawings, Figues 1 and 2 show in side elevation and end elevation, respectively, one form of apparatus embodying a device constructed according to this invention. Fig. 3 is a sectional view, to a larger scale, showing my improved device for receiving, holding, and evenly delivering predetermined quantities of pulp. Figs. 4 and 5 are similar views to Fig. 3, but showing the parts in other positions. Figs. 6 to 9 are detail views to which reference will hereinafter be made. Figs. 10 and 11 are similar views to Figs. 4 and 5, respectively, showing a modification of my improved device for receiving and holding pulp.

Figure 2:
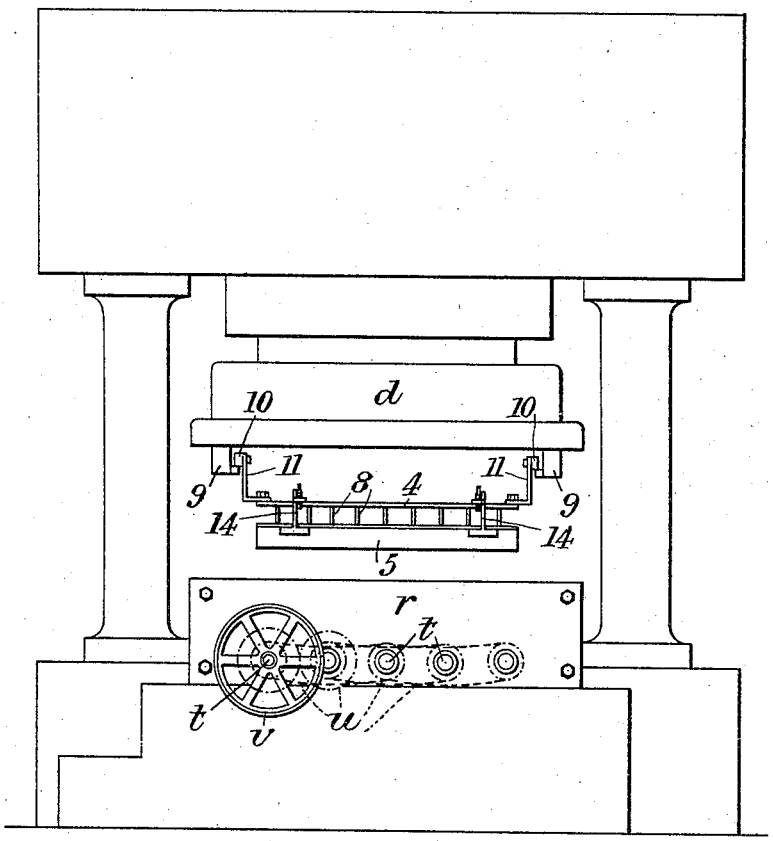

In the apparatus shown in Figs. 1 and 2 a pattern-plate with the pattern or design face upward is arranged horizontally upon the bed $b$ of a hydraulic press so as to form the bottom of a mold. The pulp in a fluid condition (containing, say, seventy to ninety-five per cent. of liquid) is delivered evenly upon the face of the pattern-plate $a$, a metal frame $c$, surrounding the pattern-plate, constituting the walls of the mold and preventing the pulp from flowing off the pattern-plate.

The pulp is contained in a vat or pulp-chest $r$, provided with mechanically-operated agitators $s$, that tend to keep the pulp evenly mixed.

The pulp-frame for receiving pulp from the vat $r$ and evenly delivering it onto the plate $a$ consists of a shallow tank the shape and size in plan of which are determined by the shape and size in plan of the pattern-plate with which it is to be used, and the depth to which it is charged is determined by the amount of pulp needed for the particular panels to be made. The bottom 5 is perforated throughout with numerous openings 2, shown rectangular and preferably with their sides or the upper portions of their sides inclined inward. (See Figs. 3 and 7.) A series of stoppers 3 corresponding to the openings 2 are secured to a plate or grid 4 (see Fig. 9) and so disposed that there is one of them in position immediately above or in perpendicular line with each of the openings 2. To the pulp-frame walls 5 is fixed a second grid 6, Fig. 8, having openings 7, through which the stems 8 of the stoppers 3 pass freely, so as to be guided thereby.

Longitudinally-arranged bars 12, whose ends are fitted with adjustable screws 13, adapted to rest on the upper edges of the ends of the pulp-vat $r$, are secured to the sides 5 of the pulp-frame by lugs 14, that extend through and work easily in holes 15, formed in the plate or grid 4.

Any suitable means may be employed to raise and lower the pulp-frame and allow it to be traversed from and to the pulp-vat $r$ and pattern-plate. In the example shown ways 9 are secured to the press ram-head $d$, and on these ways rollers 10, carried on brackets 11, fixed to the grid 4, are arranged to run, the arrangement being such that when the pulp-frame is empty and the press ram-head is in a raised position the pulp-frame proper is suspended through the stopper-stems 8 from the grid 4, which is itself suspended by the brackets 11 and rollers 10 from the roller-ways 9. (See Fig. 3.) When the parts are so disposed and the pulp-frame is over the vat $r$, the ram-head is lowered and the pulp-frame thus caused to descend into the vat $r$ until the stops 13 rest upon the edge of the vat ends and arrest the movement of the pulp-frame. (See Fig. 4.) As the ram-head continues to move downwardly the stoppers 3 gradually close the openings 2. (See Fig. 5.) When the ram-head has been completely lowered, pins 16 are passed through holes 17, formed in the lugs 14, so as to prevent the stoppers 3 from leaving the openings 2 during the subsequent raising of the ram-head. When clear of the vat, the pulp-frame is traversed along the ways 9 from the position shown in full lines in Fig. 1 to the position over the pattern-plate shown in dotted lines in Fig. 1. The ram-head is then lowered until the pulp-frame rests on the pattern-plate within the frame $c$. The pins 16 are then withdrawn and the ram-head again raised, thereby first lifting the stoppers 3 from the openings 2 and causing the contents of the pulp-frame to be quickly discharged onto the pattern-plate, with an even supply of pulp upon all parts, and then lifting the pulp-frame, which is thereupon slid along the ways 9 until it is again over the pulp-vat. When the press-head is again lowered, the pressing of the charge of pulp upon the pattern-plate and the recharging of the pulp-frame is effected simultaneously.

A downwardly-extending portion 18 of the sides 5 of the pulp-frame projects beyond the perforated bottom 1, and thereby prevents direct contact of the bottom of the pulp-frame with the face of the pattern-plate.

Figure 6:
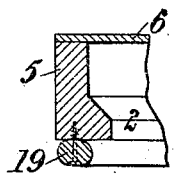
Figure 7:
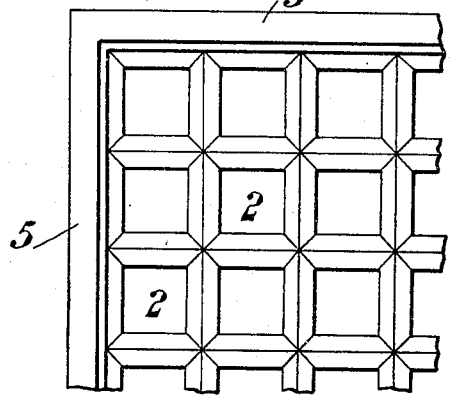
Figure 8:
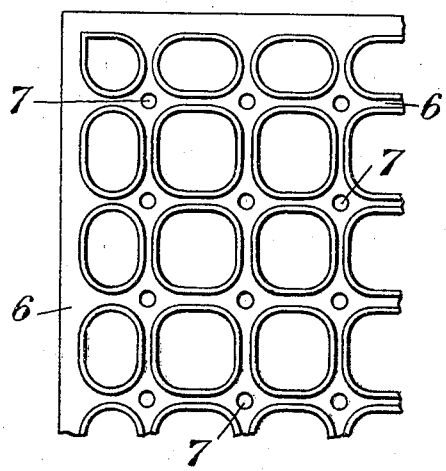
Figure 9:
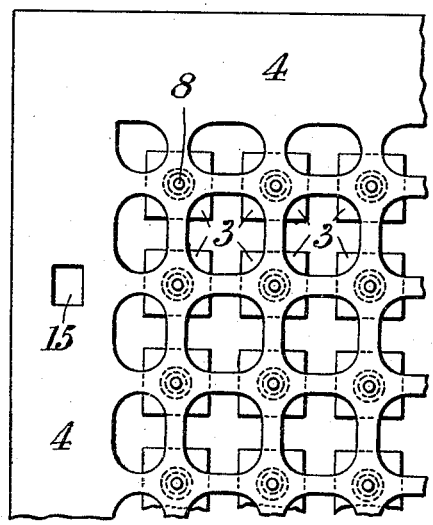

Instead of being formed with projecting portions 18 the pulp-frame $c$ may have secured along its bottom edges a hard-rubber bead 19, as shown in Fig. 6.

Instead of the bars 12, with adjustable stops 13, the pulp-frame may be supported within the vat or chest $r$ upon an adjustable support 20, (see dotted lines in Fig. 1,) which will allow the pulp to pass through the openings 2. Furthermore, as shown in Figs. 10 and 11, the grid or the like 4, carrying the stoppers 3, may be arrested by ledges or projections 21 upon the sides of the pulp-chest $r$, so that the openings 2 in the pulp-frame are not closed by the stoppers when the pulp-frame is lowered into the vat, (see Fig. 10;) but when the pulp-frame is raised from the vat the stoppers 3 first close the openings 2 in the bottom of the pulp-frame, as shown in Fig. 11.

Having now particularly described and ascertained the nature of my said invention and in what manner the same is to be performed, I declare that what I claim is—

1. For receiving and delivering pulp, containing a large amount of liquid for use in making panels and the like; an apparatus, or "pulp-frame," consisting of a receptacle with openings at bottom, and means for leaving the openings unclosed for the admission of pulp when the said frame is lowered into the pulp in a pulp-vat, and for closing the said openings to retain the pulp, and for again unclosing the openings for the exit of the pulp.

2. For receiving and delivering pulp containing a large amount of liquid for use in making panels and the like; an apparatus, or "pulp-frame," consisting of a receptable with openings at bottom and with plugs, or stoppers, for closing and unclosing the said openings, the stems of the said stoppers being attached to a separate piece and being guided in guides in connection with the "pulp-frame," substantially as, and for the purpose, hereinbefore set forth.

3. For receiving and delivering pulp containing a large amount of liquid, for making panels and the like; an apparatus, or "pulp-frame," consisting of a receptacle with openings at bottom and means for leaving the openings unclosed for the admission and exit of pulp, and for closing the openings to retain the pulp, and means for regulating the depth of immersion of the said apparatus, or "pulp-frame," in a pulp-vat, to determine the amount of pulp received by the said apparatus, or "pulp-frame," substantially as hereinbefore described.

In testimony whereof I have signed my name to this specification in the presence of two subscribing witnesses.

THOMAS JOHN PALMER.

Witnesses:
   RICHARD TOMLINSON,
   J. H. RAMSDEN.